US010899585B2

(12) United States Patent
Tasch et al.

(10) Patent No.: US 10,899,585 B2
(45) Date of Patent: Jan. 26, 2021

(54) METHOD OF CONSTRUCTION SITE MONITORING, WORK MACHINE, AND SYSTEM FOR CONSTRUCTION SITE MONITORING

(71) Applicant: Liebherr-Werk Biberach GmbH, Biberach an der Riss (DE)

(72) Inventors: Dominique Tasch, Biberach (DE); Guenther Hardock, Biberach (DE); Wolfgang Schlaucher, Biberach (DE)

(73) Assignee: LIEBHERR-WERK BIBERACH GMBH, Biberach an der Riss (DE)

( * ) Notice: Subject to any disclaimer, the term of this patent is extended or adjusted under 35 U.S.C. 154(b) by 51 days.

(21) Appl. No.: 15/900,609

(22) Filed: Feb. 20, 2018

(65) Prior Publication Data
US 2018/0170719 A1 Jun. 21, 2018

Related U.S. Application Data

(63) Continuation-in-part of application No. PCT/EP2016/001398, filed on Aug. 16, 2016.

(30) Foreign Application Priority Data

Aug. 17, 2015 (DE) .......................... 10 2015 010 726

(51) Int. Cl.
*B66C 13/16* (2006.01)
*G01S 17/93* (2020.01)
(Continued)

(52) U.S. Cl.
CPC .............. *B66C 13/16* (2013.01); *B66C 13/40* (2013.01); *B66C 15/00* (2013.01); *B66C 15/04* (2013.01);
(Continued)

(58) Field of Classification Search
None
See application file for complete search history.

(56) References Cited

U.S. PATENT DOCUMENTS 6,108,949 A * 8/2000 Singh ...................... E02F 3/437
37/195
6,246,932 B1 * 6/2001 Kageyama ........... G05D 1/0297
340/992
(Continued)

FOREIGN PATENT DOCUMENTS

CN 102219158 A 10/2011
CN 204237445 U 4/2015
(Continued)

OTHER PUBLICATIONS

ISA European Patent Office, International Search Report and Written Opinion Issued in Application No. PCT/EP2016/001398, dated Nov. 15, 2016, WIPO, 6 pages.

*Primary Examiner* — Jonathan M Dager
(74) *Attorney, Agent, or Firm* — McCoy Russell LLP

(57) ABSTRACT

The present disclosure relates to a method for real time monitoring of the current status of a construction site having one or more work machines, wherein a monitoring means installed at least one work machine monitors the environment of the work machine in real time and generates corresponding monitoring data, with the generated monitoring data being transmitted by the monitoring means to at least one processing unit for a real time evaluation of the current construction site status.

17 Claims, 2 Drawing Sheets

(51) Int. Cl.

| | | |
|---|---|---|
| *B66C 15/00* | (2006.01) | |
| *B66C 15/04* | (2006.01) | |
| *B66C 15/06* | (2006.01) | |
| *G01S 17/89* | (2020.01) | |
| *G01S 13/86* | (2006.01) | |
| *B66C 13/40* | (2006.01) | |
| *G01S 13/42* | (2006.01) | |
| *G01S 13/93* | (2020.01) | |
| *G01S 17/42* | (2006.01) | |

(52) U.S. Cl.
CPC .......... *B66C 15/045* (2013.01); *B66C 15/065* (2013.01); *G01S 13/42* (2013.01); *G01S 13/865* (2013.01); *G01S 13/93* (2013.01); *G01S 17/42* (2013.01); *G01S 17/89* (2013.01); *G01S 17/93* (2013.01); *B66C 15/06* (2013.01)

(56) References Cited

U.S. PATENT DOCUMENTS

| | | | | |
|---|---|---|---|---|
| 6,446,053 | B1* | 9/2002 | Elliott | G06Q 10/06 705/400 |
| 6,778,097 | B1* | 8/2004 | Kajita | E02F 3/437 340/12.5 |
| 6,988,591 | B2* | 1/2006 | Uranaka | E21C 41/26 187/247 |
| 7,831,345 | B2* | 11/2010 | Heino | G05D 1/0297 701/23 |
| 8,285,456 | B2* | 10/2012 | Jensen | G05D 1/0011 701/48 |
| 8,345,926 | B2 | 1/2013 | Clark et al. | |
| 8,346,468 | B2* | 1/2013 | Emanuel | G05D 1/0297 701/301 |
| 8,527,155 | B2* | 9/2013 | Gudat | E21D 9/12 701/50 |
| 8,532,341 | B2* | 9/2013 | Nielsen | G09B 29/007 382/109 |
| 8,620,708 | B2* | 12/2013 | Miyake | G06Q 10/063114 705/7.15 |
| 8,639,393 | B2* | 1/2014 | Taylor | E02F 9/2045 701/2 |
| 8,660,738 | B2* | 2/2014 | Faivre | E02F 9/26 701/29.1 |
| 8,744,746 | B2* | 6/2014 | Makela | G05D 1/0246 701/400 |
| 8,983,707 | B2* | 3/2015 | Everett | G05D 1/0291 701/24 |
| 9,020,688 | B2* | 4/2015 | Jericho | G06Q 50/02 701/32.3 |
| 9,206,589 | B2* | 12/2015 | Price | E02F 9/205 |
| 9,238,570 | B2 | 1/2016 | Schoonmaker et al. | |
| 9,243,923 | B2* | 1/2016 | Sugihara | G01C 21/3407 |
| 9,378,663 | B2* | 6/2016 | Jensen | G09B 25/06 |
| 9,384,665 | B2* | 7/2016 | Morgan | G01S 19/01 |
| 9,586,511 | B2* | 3/2017 | Terada | B60P 1/58 |
| 9,598,843 | B2* | 3/2017 | Wei | E02F 9/205 |
| 9,605,994 | B2* | 3/2017 | Jensen | G06Q 40/12 |
| 9,752,303 | B2* | 9/2017 | Jackson | G06Q 50/08 |
| 9,772,625 | B2* | 9/2017 | Gilmore | G05B 19/4189 |
| 10,082,025 | B2* | 9/2018 | MacDonald | E21C 41/26 |
| 10,114,348 | B2* | 10/2018 | Gilmore | G05B 13/04 |
| 10,133,994 | B2* | 11/2018 | Nichols | G06Q 10/06313 |
| 10,248,133 | B2* | 4/2019 | Stratton | E02F 9/2054 |
| 10,557,709 | B2* | 2/2020 | Nettleton | G01C 15/00 |
| 10,640,952 | B2* | 5/2020 | Redenbo | E02F 3/841 |
| 2002/0143461 | A1* | 10/2002 | Burns | G08G 1/207 701/117 |
| 2004/0158355 | A1* | 8/2004 | Holmqvist | G05D 1/0274 700/245 |
| 2004/0210370 | A1* | 10/2004 | Gudat | E02F 3/435 701/50 |
| 2006/0026101 | A1* | 2/2006 | Ogura | E02F 9/26 705/50 |
| 2006/0044307 | A1* | 3/2006 | Song | G06Q 10/06398 345/419 |
| 2007/0150133 | A1* | 6/2007 | Sudou | G05D 1/0278 701/23 |
| 2007/0233542 | A1* | 10/2007 | Dubreuil | G06Q 10/06315 705/7.23 |
| 2008/0133128 | A1* | 6/2008 | Koch | E02F 3/435 37/348 |
| 2008/0140431 | A1* | 6/2008 | Anderson | A01B 79/005 701/50 |
| 2008/0180523 | A1* | 7/2008 | Stratton | G09B 9/048 348/114 |
| 2008/0195434 | A1* | 8/2008 | Broughton | G06Q 10/06313 705/7.23 |
| 2008/0208393 | A1* | 8/2008 | Schricker | G08G 1/20 701/1 |
| 2008/0208415 | A1* | 8/2008 | Vik | E21C 41/26 701/50 |
| 2009/0063031 | A1* | 3/2009 | Greiner | G06Q 10/08 701/117 |
| 2009/0063226 | A1* | 3/2009 | Greiner | G06Q 10/047 705/7.26 |
| 2009/0076674 | A1* | 3/2009 | Kiegerl | E02F 9/264 701/26 |
| 2009/0202109 | A1* | 8/2009 | Clar | G09B 29/003 382/104 |
| 2009/0216410 | A1* | 8/2009 | Allen | G05D 1/0238 701/50 |
| 2010/0076640 | A1* | 3/2010 | Maekawa | G05D 1/0217 701/26 |
| 2010/0094481 | A1* | 4/2010 | Anderson | G05D 1/0295 701/1 |
| 2010/0131122 | A1* | 5/2010 | Dersjo | E02F 9/2045 701/2 |
| 2011/0112730 | A1* | 5/2011 | Rekow | A01B 69/008 701/50 |
| 2011/0153143 | A1* | 6/2011 | O'Neil | A01B 79/005 701/31.4 |
| 2011/0187548 | A1* | 8/2011 | Maynard | B66C 15/045 340/685 |
| 2011/0295460 | A1* | 12/2011 | Hunt | G06Q 10/06311 701/519 |
| 2011/0301800 | A1* | 12/2011 | Furuno | G05D 1/0274 701/25 |
| 2012/0136524 | A1* | 5/2012 | Everett | E02F 9/2054 701/24 |
| 2012/0215378 | A1* | 8/2012 | Sprock | G07C 5/008 701/2 |
| 2012/0215379 | A1* | 8/2012 | Sprock | E02F 9/2054 701/2 |
| 2012/0259537 | A1* | 10/2012 | Schmidt | H04W 4/021 701/300 |
| 2013/0024245 | A1* | 1/2013 | Nichols | G06Q 10/063 705/7.36 |
| 2013/0035978 | A1* | 2/2013 | Richardson | G06Q 30/0283 705/7.27 |
| 2013/0046525 | A1* | 2/2013 | Ali | G05D 1/0221 703/6 |
| 2013/0299440 | A1 | 11/2013 | Hermann et al. | |
| 2014/0229055 | A1* | 8/2014 | Itoi | G07C 5/008 701/31.5 |
| 2014/0240506 | A1* | 8/2014 | Glover | H04N 7/181 348/159 |
| 2014/0244098 | A1* | 8/2014 | Ueda | G06Q 10/047 701/29.3 |
| 2015/0066352 | A1* | 3/2015 | Sugihara | E21C 41/00 701/408 |
| 2015/0323913 | A1* | 11/2015 | Gilmore | G05B 13/041 700/275 |
| 2016/0231751 | A1 | 8/2016 | Mecklinger et al. | |

FOREIGN PATENT DOCUMENTS

| | | |
|---|---|---|
| DE | 112009001554 T5 | 5/2011 |
| DE | 112009002054 T5 | 7/2011 |
| DE | 112012000169 T5 | 7/2013 |

(56) References Cited

FOREIGN PATENT DOCUMENTS

| | | |
|---|---|---|
| DE | 102013016118 A1 | 3/2015 |
| JP | 2007276947 A | 10/2007 |
| JP | 4218449 B2 | 2/2009 |
| JP | 2010112100 A | 5/2010 |

\* cited by examiner

METHOD OF CONSTRUCTION SITE MONITORING, WORK MACHINE, AND SYSTEM FOR CONSTRUCTION SITE MONITORING

CROSS REFERENCE TO RELATED APPLICATIONS

The present application is a Continuation-in-Part Application of International Patent Application Serial No. PCT/EP2016/001398, entitled "METHOD FOR MONITORING A BUILDING SITE, WORK MACHINE, AND SYSTEM FOR MONITORING A BUILDING SITE," filed on Aug. 16, 2016. International Patent Application Serial No. PCT/EP2016/001398 claims priority to German Patent Application No. 10 2015 010 726.7, filed on Aug. 17, 2015. The entire contents of each of the abovementioned applications are hereby incorporated by reference in their entirety for all purposes.

BACKGROUND AND SUMMARY

The present disclosure relates to a method of real time monitoring of the current status of a construction site having one or more work machines.

The current status is that construction sites are typically digitally prepared and planned by all trades. However, as soon as work begins on the construction site, the use of digital technologies becomes vanishingly small. Predominantly paper documents such as drawings, job orders, bills of delivery and verbal communications are used during the performance of the construction work. The monitoring and control of the construction progress therefore takes place manually by comparing the available documents.

An important aspect of construction site monitoring is the setting up of anti-collision monitoring to avoid dangerous collisions of the work machines between one another and also with other objects on the construction site or with the construction installations. Collision monitoring for individual work machines has previously been realized on their individual machine controls. The machines can or have to communicate their operating movements to one another for this purpose. Machines or in particular construction equipment that do not satisfy such communication requirements are not detected by the collision monitoring.

The previous construction monitoring, however, no longer appears appropriate in times of increasing advances in technology. The present disclosure therefore sets for itself the object of searching for a suitable solution for an automated construction site monitoring.

This object is achieved, in some examples, by a method of real time monitoring of the current status of a construction site having one or more work machines. For this purpose, a monitoring device or system installed at least one work machine monitors the environment of the work machine in real time and generates corresponding monitoring data for a subsequent processing. These generated monitoring data are transmitted by the monitoring device or system to at least one processing unit for a real time evaluation of the current construction site status.

The one or more monitoring device or system detect any construction crews and/or construction site objects and/or persons and/or other work machines in the locality of the work machine. The detection and/or generation of the monitoring data can take place continuously or cyclically or manually in response to a user prompt. By monitoring over a specific time period, the monitoring data thereby generated can enable a conclusion on the progress on the construction site. The current construction progress can be monitored and checked by a comparison with a digitized construction site planning, including time-sequenced planned operations relative to the actual time, as well as positional planning and other spatial planned movements and fixed structures or hazards.

The installed monitoring device or system can, for example, be a camera or a scanner device that is installed at a suitable work machine of the construction site. A use of a transponder/transceiver technology for the monitoring is also conceivable, with the work machine or its components and/or building components being equipped with corresponding transponder modules or transceiver modules. Those machines have proven themselves as suitable work machines that allow an elevated installation position so that the monitoring device or system has a good overview over at least a part region of the construction site. In particular building cranes, i.e. tower cranes, are suitable in this case that enable an installation of the monitoring device or system at a great height, for example in the region of the tower tip or at the boom system. In particular the pivotability of the boom system at great heights results in a large monitoring radius.

Ideally, a monitoring of the environment can take place without restricting construction site operation during the regular operation of the work machine. The monitoring device or system generates those data as monitoring data that represent details of the environment of the work machine, for example one or more other work machines on the construction site or their movements, and/or construction equipment and its condition, and/or other objects of the construction site or persons on the construction site.

The transmission of the monitoring data to at least one processing unit allows the subsequent evaluation of the current construction site status. This step no longer has to take place manually using written documents, but can rather be performed in a completely or at least partly automated manner by pressing a button. In the simplest case, only a reproduction of the detected monitoring data, for example as visual information, takes place on the processing unit so that at least one remote check of the construction site status by a responsible skilled person is possible.

It is possible that the monitoring data provide a two-dimensional or three-dimensional visual representation of the machine environment. A method for an optimized planning, performance, and management of buildings with the aid of software is made use of here for the representation of the machine environment, in particular for the modeling of buildings. Known methods include "building information modeling" (abbreviation: BIM). All the relevant building data are digitally detected, combined and interlinked here. The building can also be geometrically visualized as a virtual building model (computer model), including external surface data without internal data if desired to reduce computational requirements and enable the processing to occur more efficiently as impacts at external surface of the building or structure are of primary concern.

A laser scanner with a three-dimensional scanning of the construction site environments is used for this purpose as a monitoring device, for example. The alternative or additional use of radar and/or of a transceiver-transponder solution such as RFID or RuBee is equally possible in some examples.

It is possible that the processing unit is either a central processing unit or is a component of the machine control of the monitoring work machine.

The advantage of a relocating of the processing unit to a central processing unit comprises the latter being responsible for one or more work machines or monitoring devices located on the construction site. It is conceivable that a plurality of work machines are equipped with corresponding monitoring device or system so that the generated observation data of different work machines can be combined in the central processing unit and can be evaluated together. An optimized coverage of the monitored construction site area is thereby produced. The arrangement of monitoring device or system at other objects, for example at construction equipment itself, is equally conceivable. The evaluation and representation of the current construction site status can take place in response to a user query or cyclically, for example.

It is likewise conceivable that the central processing unit caries out an anti-collision monitoring of one or more work machines based on the received monitoring data. Specific danger situations can be recognized at an early time through the monitoring data, can optionally be predicted by projection, and warning reports can optionally be sent to the respective machine controls of the work machine. A direct intervention in the controls of the respective work machines by the central processing unit is naturally also conceivable.

If the processing unit is a component of the machine control of the monitoring work machine, these monitoring data can be taken directly into account for the control of the machine actuators. This is in particular meaningful in the implementation of anti-collision monitoring. A distributed system of a local machine control and a central processing unit can also be used for the implementation of the processing unit.

The control of the one or more work machines via the processing unit, either as a component of the machine control or as a central processing unit, can, however, not only be expedient for anti-collision purposes, but can likewise enable a fully automated management of the construction site. It is, for example, conceivable that one or more work machines on the construction site are remote controlled fully automatically by the central processing unit and that the progress on the construction site can be automatically planned, monitored and carried out.

In addition to the method in accordance with the present disclosure, the present object can likewise be achieved by a work machine, in particular a crane, having at least one monitoring device or system for a real time monitoring of the work machine environment. In addition to the monitoring device or system, communications device or system are available that enable a transmission of the generated monitoring data of the monitoring device or system to a central processing unit and/or a local machine control of the work machine. Such a work machine is suitable for the implementation of the method in accordance with the present disclosure. The advantages and properties of the method in accordance with the present disclosure thus also apply without restriction to the work machine in accordance with the present disclosure.

The monitoring device or system can comprise a laser scanner device, in particular a 3D laser scanner, or can alternatively be another camera device for preparing visual monitoring data. The scanning process of the laser scanner used can take place by "airborne laser scanning" or alternatively by "terrestrial laser scanning" The arrangement of the laser scanner unit optionally takes place at an elevated installation point of the work machine vertically positioned above the ground surface. With a crane, an arrangement in the region of the tower tip or of the crane boom or also at the trolley or at the lifting hook can be recommended in this case. The power supply of the monitoring device or system can take place, for example, via the regular power supply of a trolley. The integration of a separate power supply or of an energy supply by other consumers of the crane is naturally conceivable.

In addition to the scanner unit, the monitoring device or system can additionally have at least one radar module that consists of a radar transmitter and a radar receiver. The supplementary radar module additionally permits the detection of additional spatial information; for example, a three-dimensional model of the environment can be represented through distance measurements, in particular in conjunction with the data of the laser scanner.

It is also conceivable that the monitoring device or system alternatively or additionally comprises a transponder/transceiver solution. Work machines or their components and other construction site objects or building components can be equipped with corresponding transponders that are detectable by a reception module of the monitoring device or system. They could equally be installed, like the laser scanner, in the existing monitoring device or system or can also be additionally attached.

An RFID system could be used as the transponder/transceiver solution. Since RFID systems have the disadvantage of being greatly restricted in their reception capability by metals, the standardized LWID (long wave identification) technology, also known as RuBee technology, could alternatively or additionally also be used that equally makes possible a 3D detection of the work machinery, in particular cranes, assemblies, or of all building components that are equipped with such transceiver modules/units. The units used can detect objects, store them, and have them flow into the BIM data (3D building information) of the building planning.

RFID is frequently used with the transponder technology; however, this technology has serious disadvantages in the environment of metals. We would like to use a new technology in future that is called LWID (long wave identification) or RuBee.

In addition to the work machine, the present disclosure also comprises a system having at least one such work machine in accordance with the present disclosure. The system is suitable for performing the method described herein so that the system is characterized by the same advantages and properties as the method or as the work machine. A repeat description is therefore not considered necessary.

Further advantages and properties of the present disclosure will be briefly outlined in the following.

The main core idea of the present disclosure comprises simulating, pre-planning, and monitoring construction sites digitally, and optionally also operating them in an automated manner, in future. In this context, in particular building cranes should be remotely controlled in an automated or at least partly automated manner. Devices must be present for this purpose in the future that can detect the construction progress three-dimensionally in real time and can communicate it. This is a basic requirement for the subsequent automation of construction site operation. A system is optionally desired that effectively prevents possible collisions of individual construction machines on the construction site and can even calculate them in advance.

Monitoring devices or systems for construction site monitoring are required for this purpose that are to be positioned at suitable points of the construction site to be able to obtain an overview that is as good as possible of the total procedure on the construction site. Building cranes as a rule cover all the areas of the construction site and can thus record information on the geometry and properties without obstacle. For this reason, a laser scanner device is installed at a building crane that systematically scans the construction site, also during regular construction site operation. This information is communicated to the operators of the construction site. The operator thus receives a current picture of the construction state on a regular basis or at the push of a button without himself having to be present at the construction site.

This data transmission can either take place daily or cyclically at specific time intervals. The installation of the laser scanner device at the building crane takes place close to the tower or at the boom system. The laser scanner device can be installed at the boom system or directly at the trolley or also at the lifting hook. The power supply to the trolley or to the lifting hook can be used for the energy supply of the laser scanner unit. In addition, the scanner module can have a radar sensor and radar receiver to acquire additional spatial information and thereby to avoid collisions where required.

The monitoring data of the crane are transmitted to a central processing unit that evaluates the received data and enables a monitoring of construction site operation based thereon. In addition to purely monitoring the construction site progress, collision monitoring of the individual work machines can likewise take place that works with reference to the supplied visual material of the laser scanner device or of the radar system.

A remote control of the work machines, in particular of the building cranes, is likewise conceivable by the central processing unit using the delivered monitoring data. This procedure permits fully automated construction site operation. Provision can, for example, be made for this purpose for the central processing unit to communicate with the individual machine controls of the building cranes.

Further advantages and properties of the present disclosure will be explained in more detail in the following with reference to an embodiment shown in the representations of the Figures.

DETAILED DESCRIPTION

Figure 1:
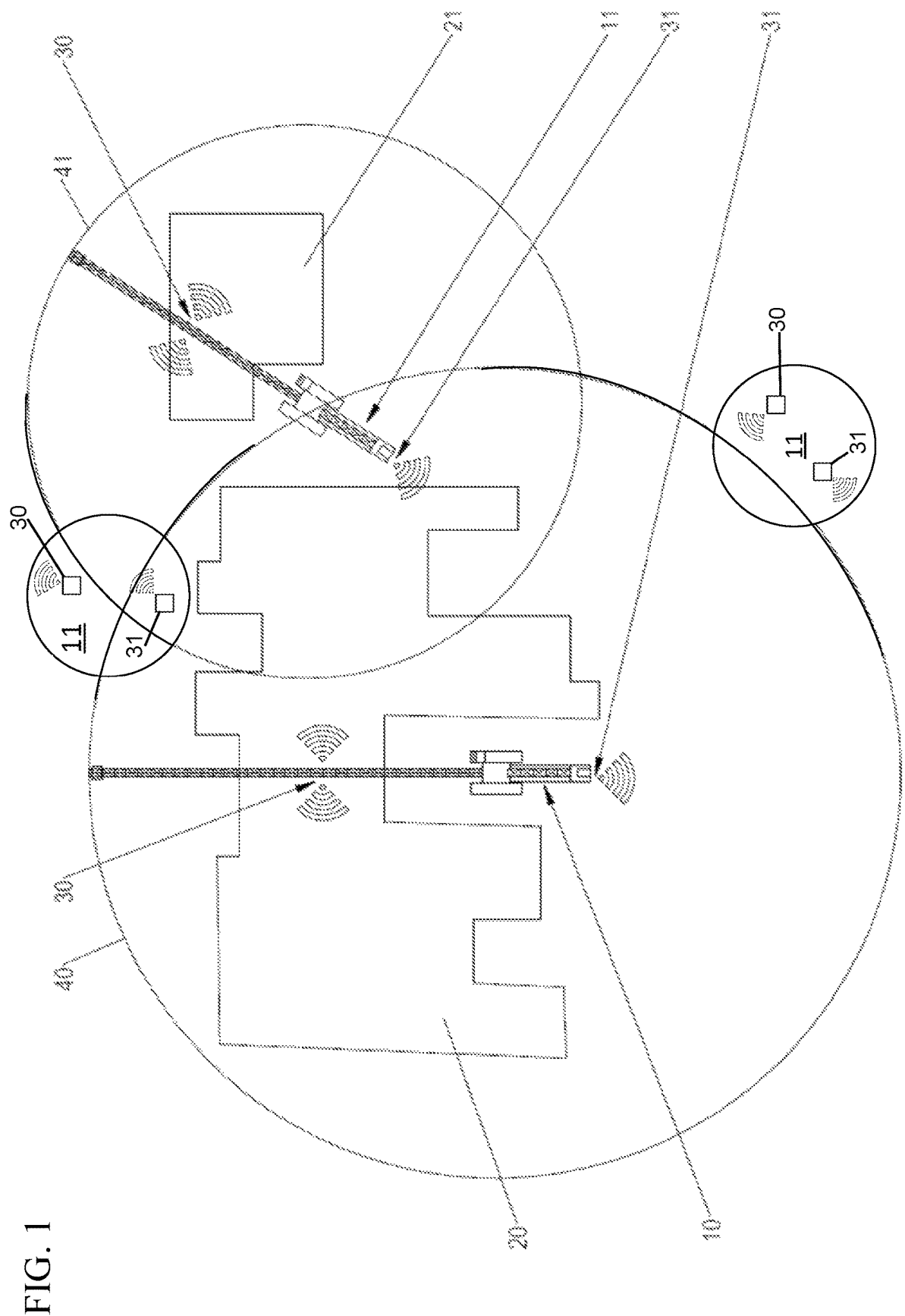
FIG. 1 shows a sketch of a construction site scenario with the cranes in accordance with the present disclosure in a plan view.
Figure 2:
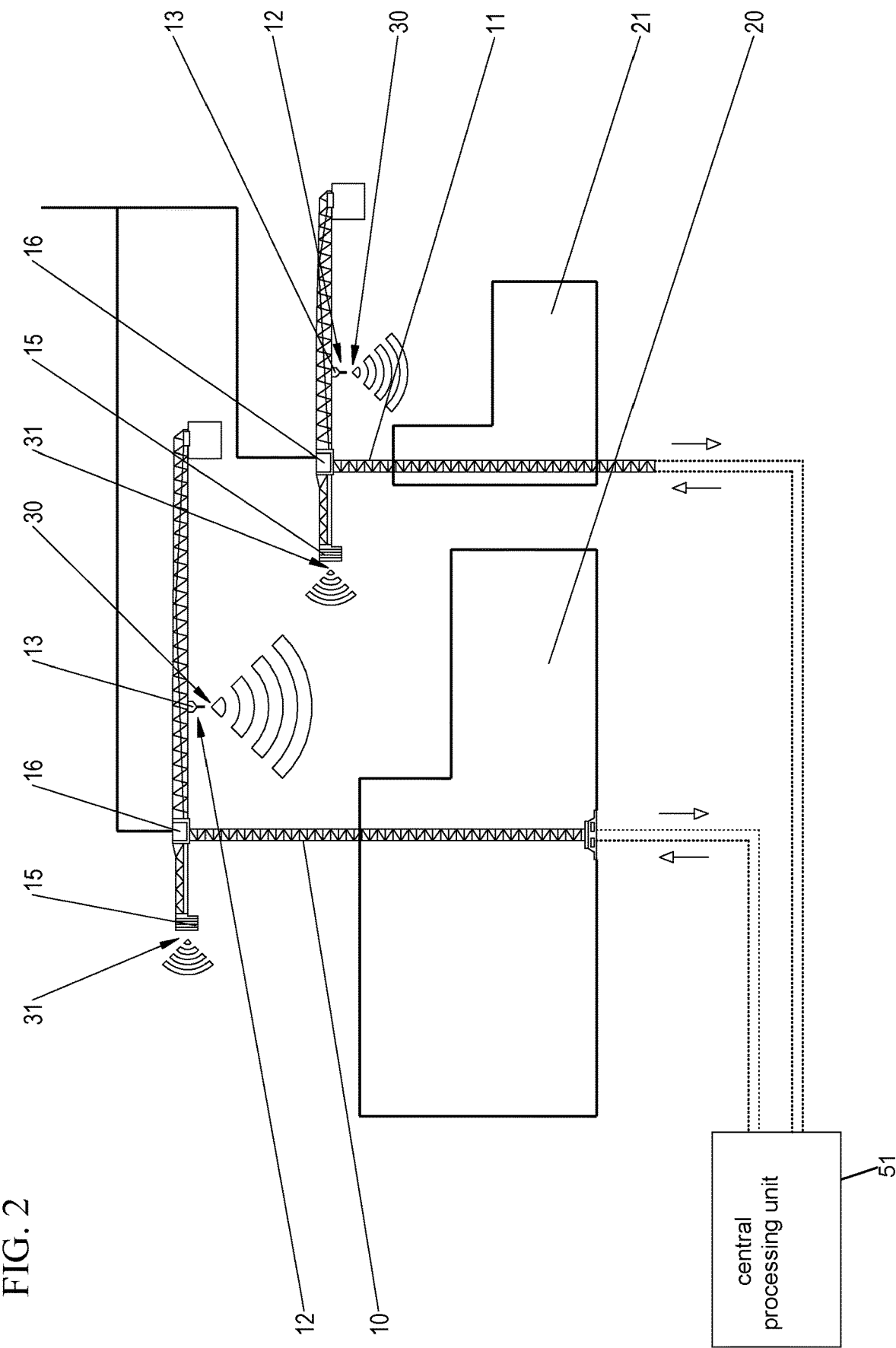
FIG. 2 shows the scenario of FIG. 1 in a side representation.

The two FIGS. 1, 2 outline a possible construction site scenario for the use of the system in accordance with the present disclosure. In this embodiment shown, it comprises two construction site cranes 10, 11 that work independently of one another and that are each configured as revolving tower cranes. Construction site monitoring is set up with the aid of the two building cranes 10, 11 that permits a monitoring of the progress on the building site, for example progress monitoring of the buildings 20, 21, drawn by way of example. While this example shows two cranes 11 with different working radii, still further cranes may also be included in the system. The cranes illustrated all have overlapping working radii, although not necessarily all overlapping with every other crane.

For this purpose, both cranes are equipped with suitable monitoring devices or system 30, 31 in the form of three-dimensional laser scanners as one example. The monitoring device may optically scan a region to capture images, including 3-D image data, surface data, and/or structure data, of the environment. A first sensor system 30 is fastened in the region of the lifting hook 12. The required power supply of the sensor system 30 is provided via the power supply of the trolley 13. A lateral and downwardly directed detection of the sensor 30 is indicated in the Figure representations. While this shows one advantageous configuration, other configurations may be used and the scope of the disclosure should not be restricted to a specific detection region or detection angle; however, the construction site region beneath and next to the crane boom is typically of interest.

A further sensor system 31 is installed in both cranes 10, 11 in the region of the boom counter-ballast 15 and scans the environment behind the counter-ballast. What has been previously stated also applies there; the 3D laser scanner sensor system 31 is not necessarily restricted to a specific detection region.

Both laser scanner sensors 30, 31 move along with the rotary boom movement so that a large region of the construction site can be scanned during the crane work. FIG. 1 shows the working radii 40, 41 of the crane booms and illustrates the detectable area of the integrated sensor systems 30, 31. A complete image of the construction site can thus be generated in the course of the crane work with a corresponding crane movement. The total construction site can be detected almost without exception in combination with the boom height of the cranes 10, 11.

The two 3D laser scanner sensors 30, 31 communicate with their respective crane controls 16 of the two cranes 10, 11 and transmit their detection data to the respective control 16 continuously or on request. A central processing unit 51 for central construction site monitoring is provided that is in communicative connection with the two crane controls 16 to exchange the sensor signals of the sensor systems 30, 31. A direct connection of the processing unit 51 to the respective sensor systems 30, 31 is also conceivable. The communication between the central processing unit 51 and the cranes 10, 11 is designed as bidirectional.

The current status on the construction site can be determined by the central processing unit 51 using the sensor signals. The sensor systems 30, 31 do not only detect the buildings 20, 21 or their construction progress, but there is likewise the option of monitoring further work machines on the construction site or their movements via the sensor systems 30, 31. Based on this, collision monitoring can be implemented with the aid of the sensor data that recognizes possible collisions between the cranes 10, 11 at an early time and takes up counter-measures as necessary. It is, for example, conceivable in this context that the central unit 51 takes direct influence on the respective crane controls 16 and transmits control commands for the remote control of the cranes 10, 11 to the machines. If, for example, an impending collision between the two machines 10, 11 is recognized by the processing unit 51, a corresponding stop signal is transmitted to one or both cranes 10, 11 via a communication actuator and an immediate machine stop is initiated by the individual machines' control systems responsive thereto. The two crane controls 16 can furthermore also be coupled to one another for a mutual exchange of information such the stop signal can be broadcast serially or in parallel, or both.

The evaluation of the sensor data received by the central processing unit 51 can take place either continuously or as required in response to a manual user query. The system in accordance with the present disclosure accordingly provides options for electronically monitoring the current status of the construction site in an ongoing manner and also in operation. It is particularly advantageous here that the monitoring does not have to take place on site, but can rather also be performed by the processing unit 51 by remote access from any desired location such as the central office of the site manager. The processing unit may include memory and instructions stored therein non-transitorily to carry out one or more of the actions described herein.

In one example, crane 10 may include the central monitoring processor and multiple other cranes, such as cranes 11, communicate with and respond to stop signals from crane 10. Note that real time monitoring includes monitoring via systems that run software routines at selected sample times and that occur during operation of the systems as the systems are being controlled and relative to a digital clock tied to the passage of actual time. In one example, the system monitors, with the processing unit, the data and compares the timing of detected events, such as movements of one or more cranes, with a construction schedule stored in the processing unit, using collected monitoring data. For example, the schedule may be pre-determined and stored in the processing unit (and/or may be updated periodically in real time during working of the machines) and includes a schedule of at what time certain events, movements, crane start-ups, crane shut-downs, building erection, building destruction, etc., are set to occur. If the monitoring detects that a scheduled event does not occur within a threshold of the scheduled time (e.g., too early, too late, or not at all), a shutdown signal may be sent and/or alarm activated. Likewise, the system may detect a movement that was not scheduled to occur, and again a shutdown signal may be sent and/or alarm activated.

The invention claimed is:

1. A method, comprising real time monitoring of a current status of a construction site having multiple work machines, wherein a monitoring device or system installed in each of the multiple work machines monitors an environment of the multiple work machines in real time and generates corresponding monitoring data, with the generated monitoring data of the multiple work machines being transmitted by the monitoring device or system to a central processing unit, and wherein a real time evaluation of the current construction site status, which includes evaluating a current construction site progress via a comparison of the current construction site status to a construction site plan, is performed by the central processing unit based on the monitoring data generated by the multiple work machines and based on a schedule of the construction site plan, wherein the schedule includes an event associated with a predetermined time, and wherein the evaluating includes detecting that a scheduled event of the construction site plan has not occurred within a threshold of the predetermined time and then activating an alarm responsive to determining that the event has not occurred within the threshold of the predetermined time and sending a shutdown signal responsive to determining that the event has not occurred within the threshold of the predetermined time.

2. The method in accordance with claim 1, wherein the monitoring device or system detects and monitors construction equipment and/or construction site objects and/or persons and/or other work machines in a machine environment.

3. The method in accordance with claim 2, wherein the monitoring data comprise a two-dimensional or three-dimensional visual representation of the machine environment.

4. The method in accordance with claim 3, wherein the central processing unit receives monitoring data from the multiple work machines located on the construction site, evaluates the monitoring data from the multiple work machines, and represents the current construction site status, in response to a manual user query or automatically at cyclic intervals.

5. The method in accordance with claim 1, wherein the central processing unit performs anti-collision monitoring between one or more work machines of the multiple work machines and construction site objects and/or further work machines stationed on the construction site using the monitoring data.

6. The method in accordance with claim 1, wherein the central processing unit is a component of a machine control of the multiple work machines, with the machine control taking account of supplied monitoring data for control of one or more machine actuators.

7. The method in accordance with claim 1, wherein the monitoring data of the multiple work machines serve a remote control of one or more work machines on the construction site.

8. The method of claim 1, wherein activating the alarm responsive to determining that the event has not occurred within the threshold of the predetermined time includes activating the alarm responsive to determining that the event has occurred earlier than the threshold of the predetermined time.

9. A work machine, having at least one monitoring system or device for a real time monitoring of a work machine environment and having a communication system or device for transmitting generated monitoring data to a central processing unit, wherein the work machine environment includes at least one additional work machine that transmits additional monitoring data to the central processing unit, wherein the central processing unit performs a real time evaluation of a current construction site status utilizing the monitoring data and the additional monitoring data, and wherein the real time evaluation includes evaluating a current construction site progress based on a comparison of the current construction site status to a construction site plan and based on a schedule of the construction site plan, wherein the schedule includes an event associated with a predetermined time, and wherein the evaluating includes detecting that a scheduled event of the construction site plan has not occurred within a threshold of the predetermined time and then activating an alarm responsive to determining that the event has not occurred within the threshold of the predetermined time and sending a shutdown signal responsive to determining that the event has not occurred within the threshold of the predetermined time.

10. The work machine in accordance with claim 9, further including instructions stored in memory for monitoring the environment of the work machine in real time and generating the monitoring data, with the monitoring data being transmitted by the monitoring device or system to the central processing unit for the real time evaluation of the current construction site status, and transmitting monitoring data to a local machine control of the work machine.

11. The work machine in accordance with claim 9, wherein a monitoring means for the at least one monitoring system or device comprises a laser scanner device, and/or a transceiver/transponder device.

12. The work machine in accordance with claim 9, wherein a monitoring means for the at least one monitoring system or device is arranged at a boom of the work machine, with a power supply of the monitoring system or device provided via an existing energy supply of the boom.

13. The work machine in accordance with claim 12, wherein the monitoring system or device additionally comprises a radar module having a radar sensor and a radar receiver for detection of additional spatial information.

14. The work machine in accordance with claim 11, wherein the laser scanner device is a 3D laser scanner.

15. The work machine of claim 9, wherein the evaluation of the current construction site progress includes comparing the monitoring data and the additional monitoring data over a time period to a schedule of the construction site plan.

16. A system, comprising:
a first work machine having a first working radii;
a second work machine having a second radii;
a worksite in which the first and second work machines are positioned;
a control system coupled in one of the work machines including instructions stored therein for in real time, monitoring a current status of the worksite via the first work machine and the second work machine, including monitoring an environment of the first work machine and the second work machine in real time and generating corresponding monitoring data via the first work machine and the second work machine, with the generated monitoring data of the first work machine and the second work machine being transmitted to the system for a real time evaluation of the current worksite status, the data including 3-D images, wherein the system detects and monitors construction equipment and/or construction site objects and/or persons and/or other work machines in the environment based on the generated monitoring data from the first work machine and the second work machine, wherein the real time evaluation of the current worksite status includes, via the system, evaluating a current construction progress based on a comparison of the current worksite status with a construction schedule of a construction plan using the generated monitoring data of the first work machine and the second work machine and based on a schedule of the construction site plan, wherein the schedule includes a predetermined time and an event associated with the predetermined time, and wherein the evaluating includes detecting that a scheduled event of the construction site plan has not occurred within a threshold of the predetermined time and then activating an alarm responsive to determining that the event has not occurred within the threshold of the predetermined time and sending a shutdown signal responsive to determining that the event has not occurred within the threshold of the predetermined time.

17. The system in accordance with claim 16, wherein the construction plan is a digitized plan, and wherein the construction schedule of the construction plan includes time-sequenced planned operations relative to an actual time.

* * * * *